(12) United States Patent
Kealy et al.

(10) Patent No.: US 11,631,984 B2
(45) Date of Patent: *Apr. 18, 2023

(54) SWITCHABLE DEVICE CHARGER WITH STATUS ILLUMINATOR

(71) Applicants: Patrick Kealy, Hermosa Beach, CA (US); Rodney Houriani, Beverly Hills, CA (US)

(72) Inventors: Patrick Kealy, Hermosa Beach, CA (US); Rodney Houriani, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,682

(22) Filed: Dec. 22, 2021

(65) Prior Publication Data

US 2022/0115885 A1 Apr. 14, 2022

Related U.S. Application Data

(63) Continuation of application No. 16/782,332, filed on Feb. 5, 2020, now Pat. No. 11,251,634.

(60) Provisional application No. 62/965,272, filed on Jan. 24, 2020.

(51) Int. Cl.
*H01M 10/46* (2006.01)
*H02J 7/00* (2006.01)
*G06F 1/26* (2006.01)

(52) U.S. Cl.
CPC ............ *H02J 7/0045* (2013.01); *G06F 1/266* (2013.01); *H02J 7/00034* (2020.01); *H02J 7/0044* (2013.01); *H02J 7/007182* (2020.01); *H02J 2207/30* (2020.01); *H02J 2310/22* (2020.01)

(58) Field of Classification Search
CPC ... G06F 1/266; H02J 2207/30; H02J 2310/22; H02J 7/0045; H02J 7/0044; H02J 7/00034; H02J 7/007182; H02J 7/0047
USPC ............ 320/107, 111, 114, DIG. 18; 439/46, 439/188, 189, 190
See application file for complete search history.

(56) References Cited

U.S. PATENT DOCUMENTS

| | | | |
|---|---|---|---|
| 5,518,411 | A | 5/1996 | Belleci |
| 7,815,469 | B1 | 10/2010 | Nguyen |
| 8,382,065 | B2 | 2/2013 | Hendrickson |
| 9,148,001 | B1 | 9/2015 | Mohanty et al. |
| 9,153,986 | B1 | 10/2015 | Herr et al. |
| 11,251,634 | B2 * | 2/2022 | Kealy ............. G06F 1/266 |
| 2009/0294150 | A1 | 12/2009 | McGinley |
| 2010/0321878 | A1 | 12/2010 | Huang |
| 2014/0191705 | A1 | 7/2014 | Takao |
| 2015/0126070 | A1 | 5/2015 | Candelore |

(Continued)

*Primary Examiner* — Edward Tso
(74) *Attorney, Agent, or Firm* — The Law Office of Judd M. Patton

(57) ABSTRACT

A selectable USB charging cable which may have a switch configured to permissively control the transmission of an electrical current between two internet connected, or electronically powered, devices. By use of the reversibly selectable switch, a user of the charging cable may select an on configuration or an off configuration of the switch. The switch may reversibly stop the transmission of the electrical current between two electronically powered devices by use of a permissible selection between the on configuration and off configuration of the switch. The electrical current stopped by the switch may correspond to data transmission or power transmission to or from an electronically powered device.

19 Claims, 14 Drawing Sheets

(56) References Cited

U.S. PATENT DOCUMENTS

2015/0171648 A1 6/2015 Williams

* cited by examiner

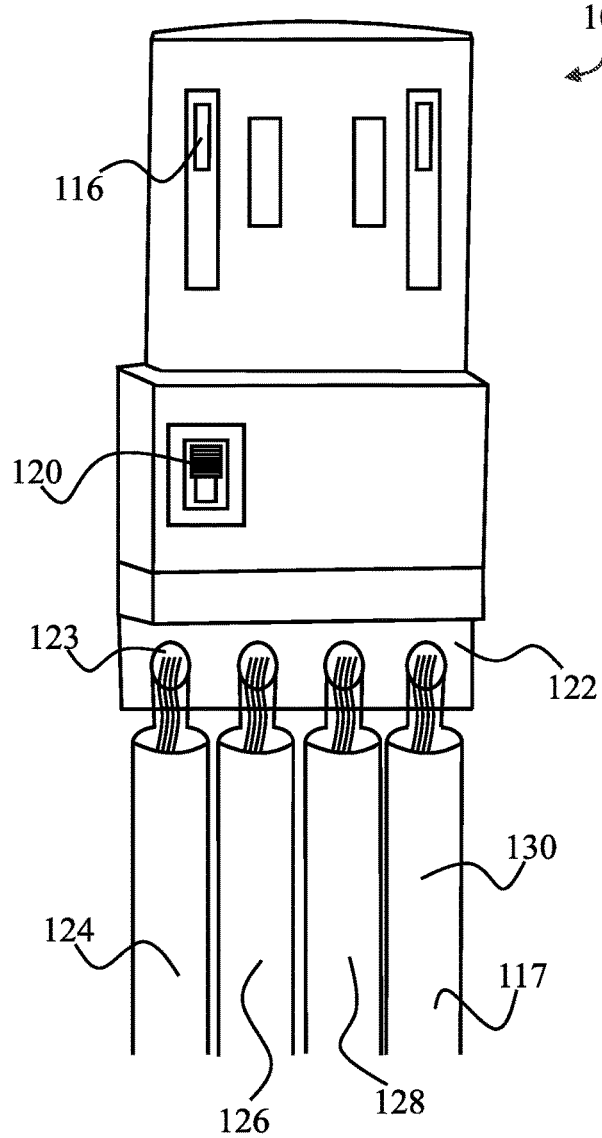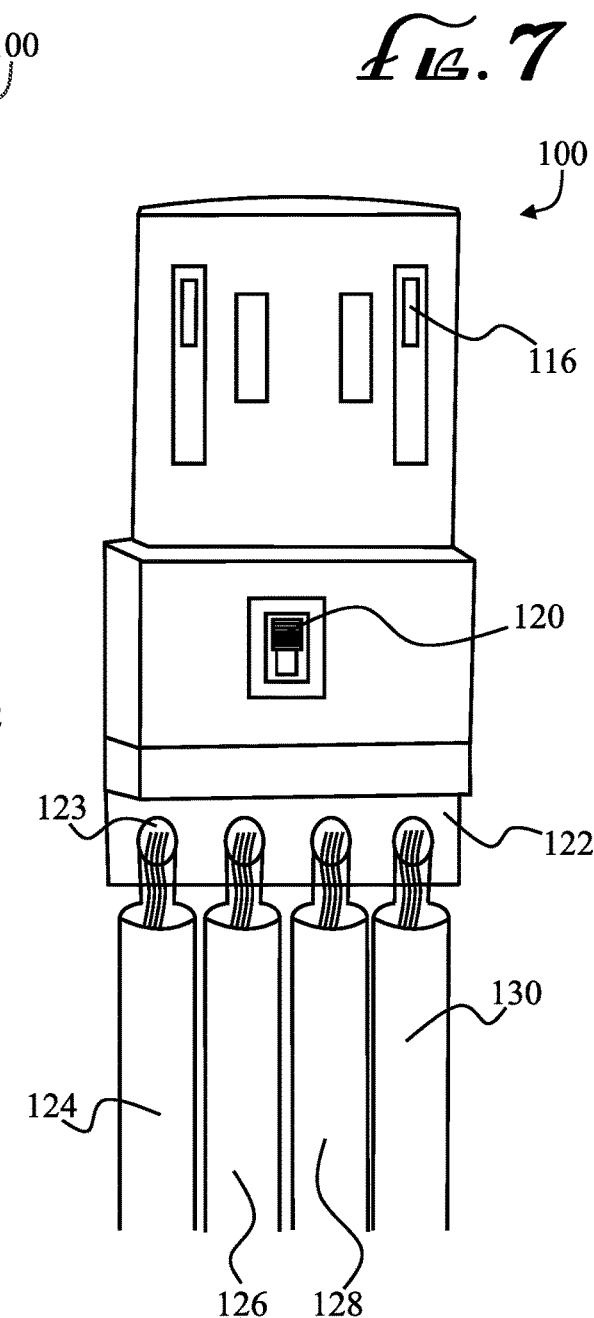

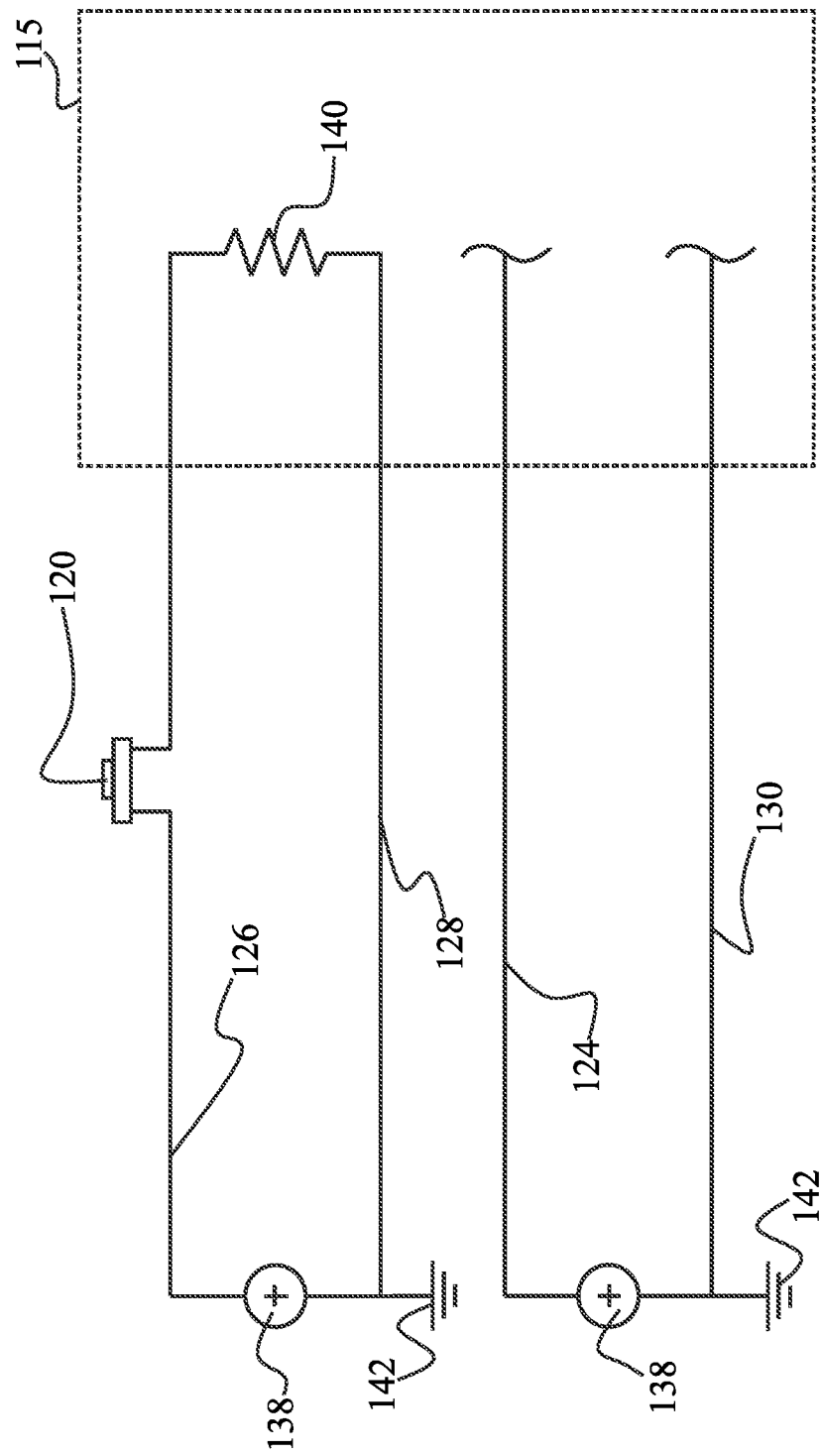

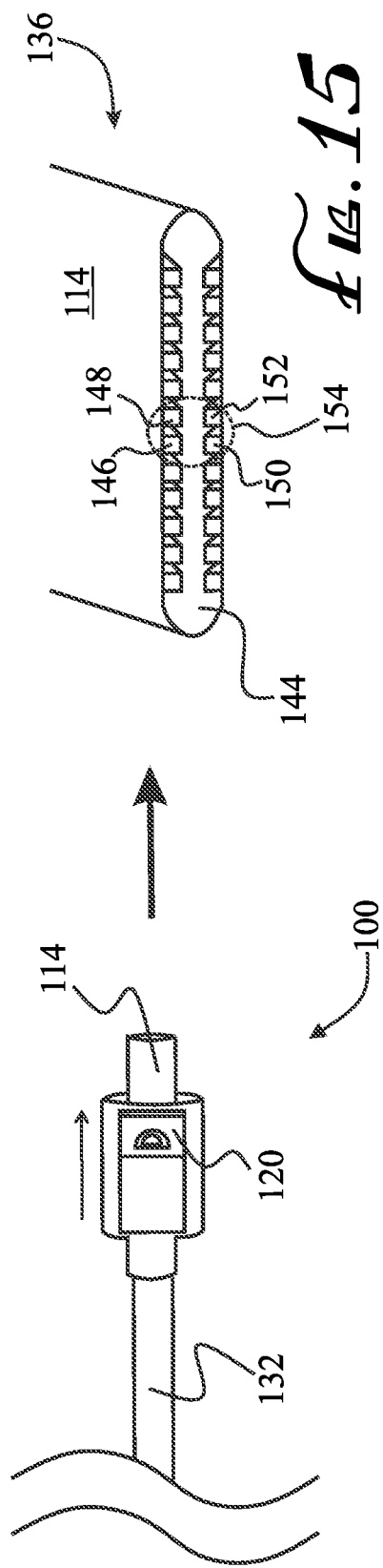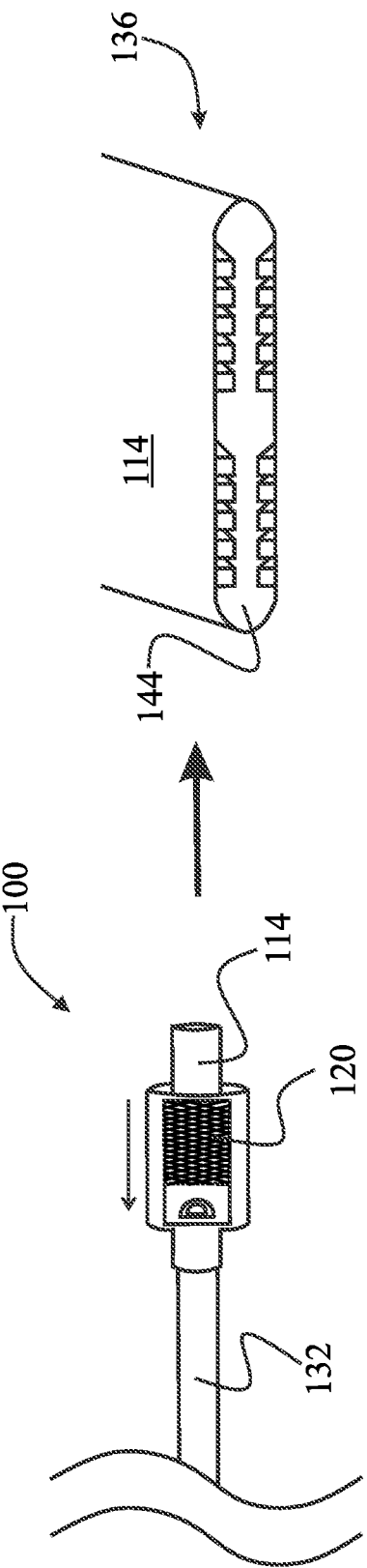

SWITCHABLE DEVICE CHARGER WITH STATUS ILLUMINATOR

RELATED APPLICATIONS

This application is a continuation of U.S. patent application Ser. No. 16/782,332, filed Feb. 5, 2020, which claims the benefit of provisional patent application No. 62/965,272 filed Jan. 24, 2020, the contents of each of which are incorporated by this reference in the entirety for all purposes as if fully set forth herein.

TECHNICAL FIELD

The disclosure herein relates generally to devices and methods for the protection of data and the election of power transmission between two electronic devices. More particularly, the disclosure relates to devices and methods to facilitate the selection of data transmission and power transmission by way of a physical disconnection at any location of a charging cable, including the terminal ends, which results in desired protection of data and charge capacity of a battery.

BACKGROUND

Chargers for devices are well known in the art, and there are many varieties for consumers to select from. These charging devices have independent wiring which may be used for data transmission, power transmission, and identification of the charging device. Because these devices incorporate the data and power transmission cables and ports into one charging package, there is a strong potential for a user's data to be stolen when charging at unknown locations, or when using unknown charging devices.

While there is encryption software available to users of data and internet-connected devices, such encryption software may still become vulnerable to hackers. Regardless of the strength of any encryption protocol, there will be a more advanced software program ready to attempt to crack the encryption code or to seek various backdoor entryways into data caches. Moreover, encryption may be bypassed entirely if an internet-connected device does not recognize a data connection as being untrustworthy. Such attacks already occur routinely and with ease.

Data breaches can result in billions of dollars annually in lost revenue and lost control over data. When data breaches occur, hackers and malevolent actors may alter the data resulting in fomenting a sense of untrustworthiness in the data being observed. It remains a critical priority of any individual who relies on data to be able to trust the data being used.

What is needed is a charging device wherein the data of a user may be physically protected. Such a device would limit and/or prohibit the physical connection between the data port of the charging device and the device being charged. Such a physical prohibition of contact would obviate the need for use of reliance on encryption software. Moreover, such a charging device may be electable between power transmission and data transmission. This would allow a greater degree of control for the user of these charging devices and would prevent needless billions of dollars annually in data breach recovery.

SUMMARY

This disclosure may relate to a selectable Charger cable that may have a first plug that may be connected to one end of a cord and a second plug which may be connected to the other end of the same cord. The cord may span between the first plug and the second plug. Further, the first plug and the second plug may each have a multiplicity of connector pins. The cord may further have a multiplicity of transmission wires. The transmission wires and the connector pins may be configured for transmission of an electrical current. Additionally, a switch may be configured to permissively control the transmission of the electrical current by use of a reversible selection of an "on" configuration or an "off" configuration of the switch.

The switch may be configured to reversibly stop the transmission of the electrical current between two electronically powered devices by use of a permissible selection between an on configuration and an off configuration of the switch. The switch may also be connected to the data transmission wires and power transmission wires and be configured to permissively control the electrical conduction of the transmission along the data transmission wires and power supply wires. The switch may also be connected to either the first plug or the second plug.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are not to be considered limiting of its scope, the disclosure will be described with additional specificity and detail through the use of accompanying drawings. Accordingly, further advantages of the present subject matter may become apparent to those skilled in the art with the benefit of the following detailed description of the preferred embodiments and upon reference to the accompanying drawings in which:

FIG. 6 is a perspective view of a modified port of a charging device in accordance with one non-limiting embodiment for use in charging internet-connected devices wherein a switch is employed to select between a connected and unconnected power port;

FIG. 7 is a perspective view of a modified port of a charging device in accordance with one non-limiting embodiment for use in charging internet-connected devices wherein a switch is employed to select between a connected and unconnected data port;

FIG. 14 is a non-limiting schematic view of a circuit pathway by which a modified cable of an embodiment of a charging device may route power and/or data to a portable internet-connected device;

FIG. 15 is a perspective view of a modified port of a charging device in accordance with one non-limiting embodiment for use in charging internet-connected devices wherein a sliding type switch is illustrated in a data on configuration;

FIG. 16 is a perspective view of a modified port of a charging device in accordance with one non-limiting embodiment for use in charging internet-connected devices wherein a sliding type switch is illustrated in a data off configuration;

DETAILED DESCRIPTION OF THE PREFERRED EMBODIMENTS

Figure 1:
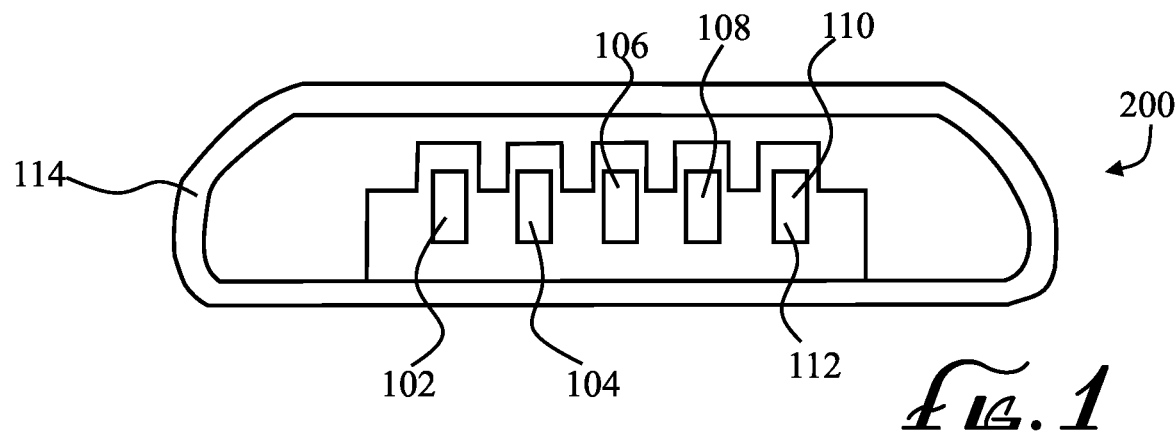
FIG. 1 is a plan view a common port of a charging device in accordance with one non-limiting embodiment for use in charging internet-connected devices.

Embodiments of systems, components, and methods of assembly and manufacture will now be described with reference to the accompanying figures. Although several embodiments, examples, and illustrations are disclosed below, it will be understood by those of ordinary skill in the art that the embodiments described herein extend beyond the specifically disclosed configurations, examples, and illustrations, and can include other users of the disclosure and obvious modifications and equivalents thereof. The terminology used in the descriptions presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing any one of the several embodiments herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," "top," "bottom" and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specially mentioned above, derivatives thereof, and words of similar import.

"Permissible" as may be used herein may refer to the selective ability of a user of the selectable charger 100 to selectively alternate the configuration of a switch 120 to an on configuration or an off configuration. An on configuration may mean that the electrical circuit is configured to allow the transmission of current through the selectable Charger 100 in its entirety. An off configuration may mean that the electrical circuit is configured to prohibit the transmission of current through the selectable Charger 100 in its entirety. Permissible and "permissively" may be interchangeable terms. The term "control the electrical" current may refer to the alternation between an on configuration and an off configuration.

Referring to the drawings, like reference numerals designate identical or corresponding features throughout the several views. Described herein are certain non-limiting embodiments of a selectable charger 100 for use in the protection and support of safe data and power transmissions and controls therein. An "internet-connected" device as used herein shall refer to any device which may have a connection to the internet or may store and retrieve sensitive data whether the device is connectable to the internet or not.

Referring now to FIG. 1, shown is a standard layout of pins for a micro universal serial bus (USB) connector 200. Indicated from left to right are a power pin 102, a first data pin 104, a second data pin 106, an identification pin 108, and a ground pin 110. Collectively, the power pin 102, the first data pin 104, the second data pin 106, the identification pin 108, the ground pin 110, and any other pin type may collectively be referred to as a connector pins 112. This left to right orientation is common to the industry, but all possible iterations and combinations are both contemplated and possible when designing a layout for connector pins 112. Moreover, this disclosed list of the power pin 102, the first data pin 104, the second data pin 106, the identification pin 108, and the ground pin 110 is not exhaustive, and other pin types exist and are contemplated to function as described herein. Thus, the term connector pin 112 as used in this disclosure shall refer to any contemplated pin incorporated into any contemplated layout for any contemplated USB type connector. Accordingly, any connector pin 112 may be physically retracted or may have the capability to have the signal physically blocked from transmission from one end to another end of the selectable charger 100.

Further shown is a housing 114. The housing 114 is designed to enclose the connector pins 112, including but not limited to the first data pin 104, the second data pin 106, the identification pin 108, the ground pin 110, and any other type of connector pin 112. Moreover, the housing 114 may aid in guiding the alignment between an internet-connected device 115 (as shown in FIG. 14) and that of the USB for use in charging said device. The internet-connected device 115 as illustrated in FIG. 14 may be any type of device which has, will have, or has had connectivity to the internet. Moreover, the use of the term internet-connected device 115 may be synonymous with electronically powered device 115 as described herein and illustrated in FIG. 14. Further, it will be understood that more than one electronically powered device 115 may be described at one time. Thus, if this disclosure refers to a first electronically powered device 115, a second electronically powered device (not shown), or a third electronically powered device (not shown), then it will be known that the same reference number shall constitute an electronically powered device 115 generally and does not refer to any single specific electronically powered device 115. Further, the use of the term "first" and "second" in regard to an electronically powered device 115 shall mean different, as in, not the same electronically powered device 115 such that the selectable charger 100 will not make a first connection to a first electronically connected device 115 and then loop back to the first electronically powered device 115, the first electronically powered devices 115 and second electronically powered device (not shown) are not the same devices.

Figure 2:
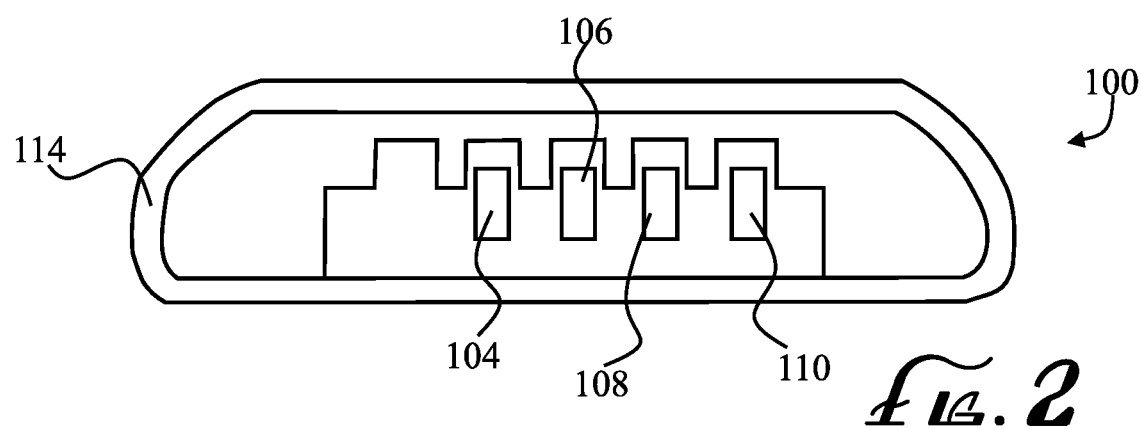
FIG. 2 is a plan view of a selectively modified port of a charging device in accordance with one non-limiting embodiment for use in charging internet-connected devices.
Figure 3:
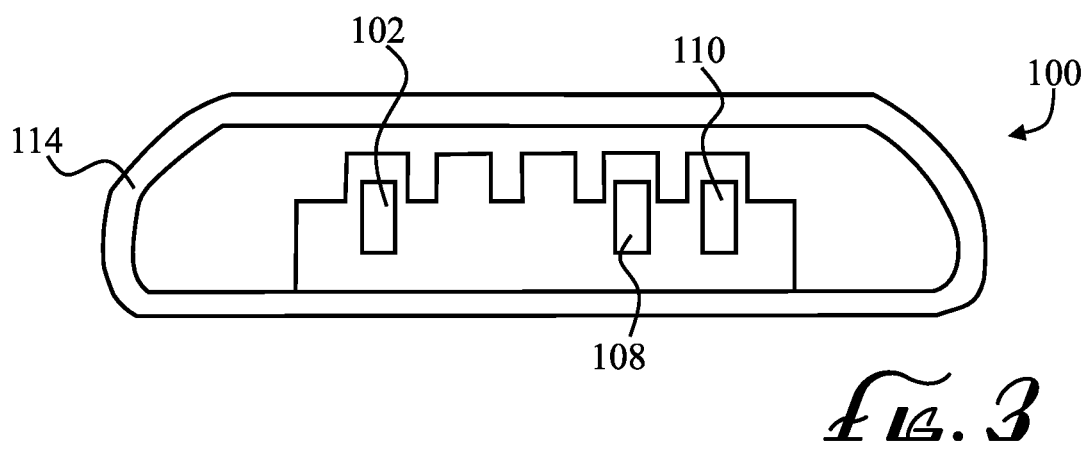
FIG. 3 is a plan view of a selectively modified port of a charging device in accordance with one non-limiting embodiment for use in charging internet-connected devices.

Referring now to FIG. 2, shown is one embodiment of the selectable charger 100 as it related to the disclosure herein. This embodiment represents a USB type connector wherein the power pin 102 (as seen in FIGS. 1 and 3) has been retracted and thus may not be capable of making physical contact with any respective internet-connected device 115 (as shown in FIG. 14). Therefore, no power charging functions could be achieved by this configuration. The retraction (as shown in FIG. 16) may occur by any means known by those skilled in the art, including but not limited to; by way of a retention member (not shown) engaged at the base of the power pin 102, a biasing member (not shown) engaged at the base of the power pin 102, by use of a lever (not shown) engaged at the base of the power pin 102, or by use of a sliding-type switch 120 as shown in FIG. 16. The sliding-type switch 120 (as shown in FIG. 6), according to one embodiment, may be contemplated to be mechanically attached to the power pins 102 and/or data pins 104 whereby the mechanical movement from an on configuration to an off configuration pulls and retains the connectors pins 112 and prevents contact with any port of an internet-connected device (as shown in FIG. 14). As it may relate to this application, the term "on" in relation to the switch 120 will mean that data or power transfer functionality is capable, while the term "off" will mean that data or power transfer functionality is not capable.

Referring now to FIG. 3, shown is one additional embodiment of the selectable charger 100 as it related to the disclosure herein. This embodiment represents a USB type connector wherein the first data pin 104 and the second data pin 106 (as seen in FIGS. 1 and 2) have been retracted and thus may not be capable of making physical contact with any respective internet-connected device 115 (as shown in FIG. 14). Therefore, no data transfer or data transmission functions could be achieved by this configuration. The retraction (as shown in FIG. 16) may occur by any means known by those skilled in the art, including but not limited to; by way of a retention member (not shown) engaged at the base of the first data pin 104 and second data pin 106, a biasing member (not shown) engaged at the base of the first data pin 104 and second data pin 106, by use of a lever (not shown) engaged at the base of the first data pin 104 and second data pin 106, or by use of a sliding-type switch 120 as shown in FIG. 16. The sliding-type switch 120 (as shown in FIG. 6), according to one embodiment, may be contemplated to be mechanically attached to the power pins 102 and/or data pins 104 whereby the mechanical movement from an on configuration to an off configuration pulls and retains the connectors pins 112 and prevents contact with any port of an internet-connected device (as shown in FIG. 14).

Figure 4:
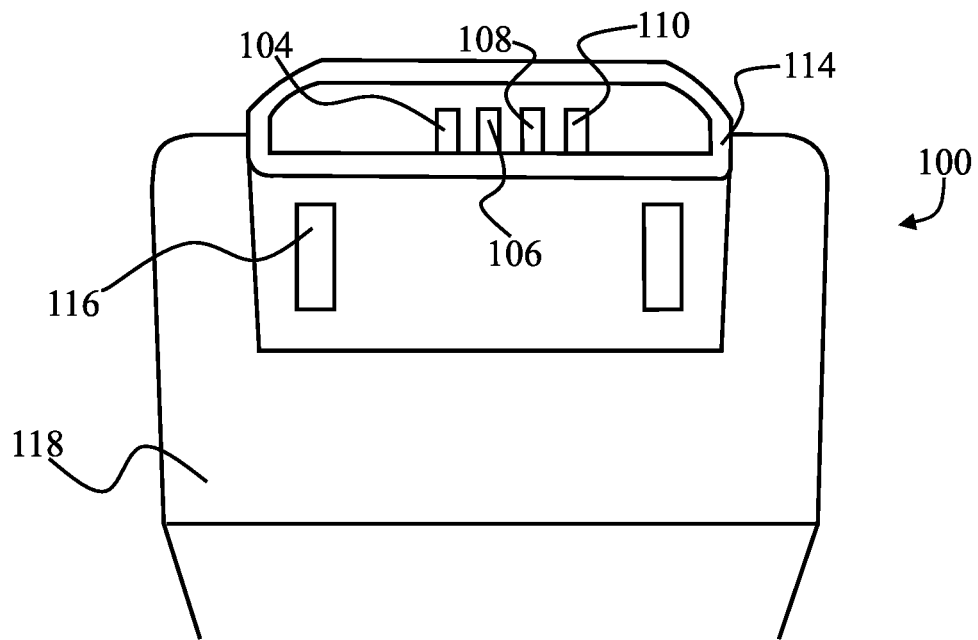
FIG. 4 is a perspective view of a selectively modified port of a charging device in accordance with one non-limiting embodiment for use in charging internet-connected devices.

Referring now to FIG. 4, shown is one additional embodiment of the selectable charger 100 as it related to the disclosure herein. This embodiment is similar to FIG. 2 and likewise represents a USB type connector wherein the power pin 102 (as seen in FIGS. 1 and 3) has been retracted and thus may not be capable of making physical contact with any respective internet-connected device 115 (as shown in FIG. 14). Therefore, no power charging functions could be achieved by this embodiment. The retraction (as illustrated in FIG. 16) may occur by any means known by those skilled in the art, including but not limited to each of the previously described examples. Additionally illustrated is that of a biased retention member 116 and a casing 118. The purpose of the biased retention member 116 is to ensure that the selectable charger 100 maintains connection contact with any internet-connected device 115 (as shown in FIG. 14). The casing 118 may protect the internal wiring (shown on FIGS. 6 and 7) from possible damage through normal use of the selectable charger 100.

Figure 5:
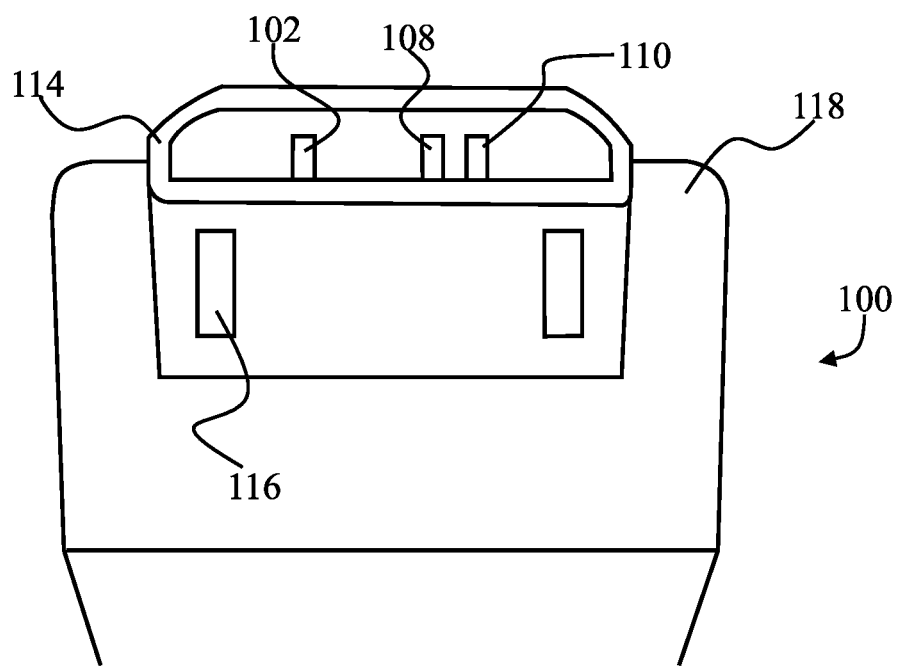
FIG. 5 is a perspective view of a selectively modified port of a charging device in accordance with one non-limiting embodiment for use in charging internet-connected devices.

Referring now to FIG. 5, shown is one additional embodiment of the selectable charger 100 as it related to the disclosure herein. This embodiment is similar to FIG. 3. This embodiment also represents a USB type connector wherein the first data pin 104 and the second data pin 106 (as seen in FIGS. 1 and 2) have been retracted and thus may not be capable of making physical contact with any respective internet-connected device 115 (as shown in FIG. 14). Therefore, no data transfer or transmission functions could be achieved by this embodiment with power transfer being the only possibility. The retraction (not shown) may occur by any means known by those skilled in the art, including but not limited to each of the previously described examples.

Referring now to FIG. 6, illustrated is a further embodiment of the selectable charger 100 equipped with a switch 120 functionality. This illustration displays the internal wiring, collectively and singularly the internal wiring may be referred to as a transmission wire 117 or transmission wires 117. Moreover, there may be one or more than one transmission wire 117 which may transmit data, and there may be one or more than one transmission wire 117 which may transmit power. Where the internal wiring is displayed as having one or more than one transmission wire 117, as it may appear without the casing 118 (seen in FIG. 5) or the external wire wrap (not shown), any one or more than one of the transmission wires 117 may be assigned for any transmission task commonly known or used in the industry. The wiring may be connected to a backing plate 122 by way of a solder junction 123. The backing plate may be constructed of silicone, any metal, any bimetal, plastic, or any other material commonly known and understood in the industry. The backing plate 122 provides a connection point between the incoming wiring and any printed computer boards (not shown) that may be incorporated for the proper functionality of the selectable charger 100. The switch 120 may be, by way of example only, a standard on-off type switch, or a toggle type switch which may maintain a toggled configuration of on or off.

Figure 10:
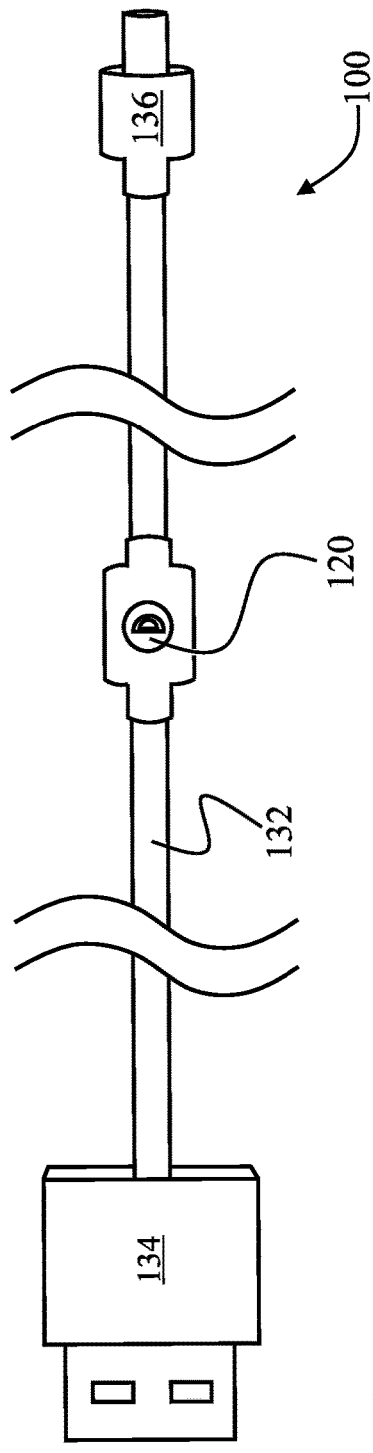
FIG. 10 is a perspective view of a modified cable of a charging device in accordance with one non-limiting embodiment for use in charging internet-connected devices wherein a toggle type switch is deployed as some point along the charging cable.
Figure 11:
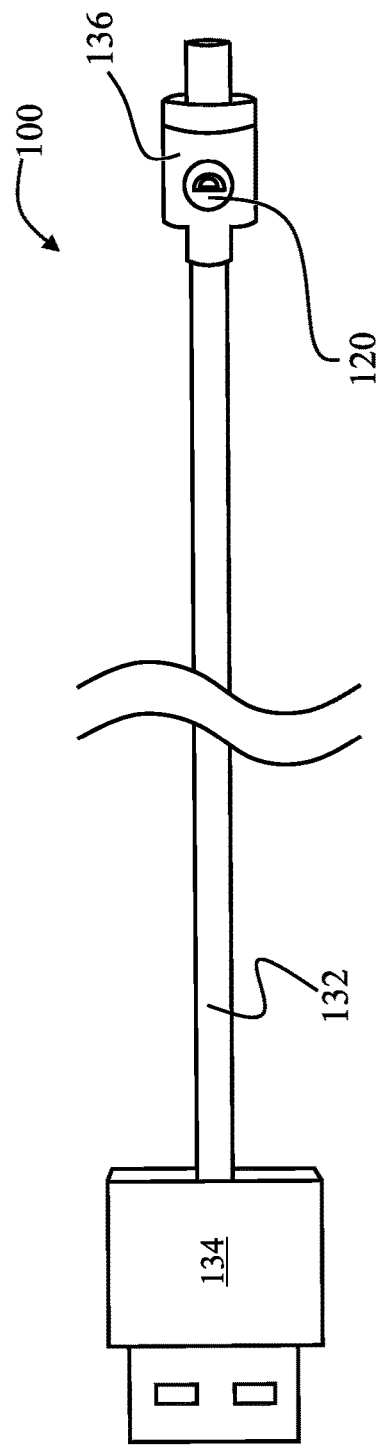
FIG. 11 is a perspective view of a modified port of a charging device in accordance with one non-limiting embodiment for use in charging internet-connected devices wherein a toggle type switch is deployed at a terminal end of a charging device.

By way of example only, the switch 120 illustrated in FIGS. 6 and 7 may be a sliding type switch 120, while the switch illustrated in FIGS. 10 and 11 may be of a toggle type switch 120. Other switch types are contemplated provided that the switch provides a physical decoupling of any given incoming wire transmission to that of the selectable charger 100. The wiring of this embodiment may include a power supply wire 124, a first data transmission wire 126, a second data transmission wire 128, and a ground wire 130. The placement of the switch in this embodiment may be adjacent to the incoming power supply wire 124, and thus this embodiment represents a switch 120 with power cut off functionality. However, it is contemplated that the selectable charger 100 may incorporate a power shut off functionality and a data shut off functionality on the same selectable charger 100 and this FIG. 6 by no means limits this disclosure to the embodiment illustrated in FIG. 6. The term "first" and "second" as used herein may simply refer to there being one or more than one transmission wire 117 and is used for clarity only. The term "a transmission wire 117" as used in this disclosure may refer to either a first data transmission wire 126 or a second data transmission wire 128.

Referring now to FIG. 7, illustrated is a further embodiment of the selectable charger 100 equipped with a switch 120 functionality. This illustration, as was the case with FIG. 6, displays the internal wiring as it may appear without the casing 118 (seen in FIG. 5). The wiring may be connected to a backing plate 122 by way of a solder junction 123. The solder junction 123 represents the physical coupling of any one wire with the backing plate 122. The solder junction 123 may not be limited to the use of solder but is contemplated to make the connection types other than solder, by way of example only, with screws, with welds, or by use of epoxides or other potentially conductive thermoplastic resins. The wiring of this embodiment may include a power supply wire 124, a first data transmission wire 126, a second data transmission wire 128, and a ground wire 130. The placement of the switch in this embodiment may be adjacent to the incoming first data transmission wire 126 and second data transmission wire 128, and thus this embodiment represents a switch 120 with data transmission cut off functionality. However, it is contemplated that the selectable Charger 100 may incorporate power shut off functionality and data shut off functionality on the same selectable Charger 100 and this FIG. 7 by no means limits this disclosure to the embodiment illustrated in FIG. 7.

Figure 8:
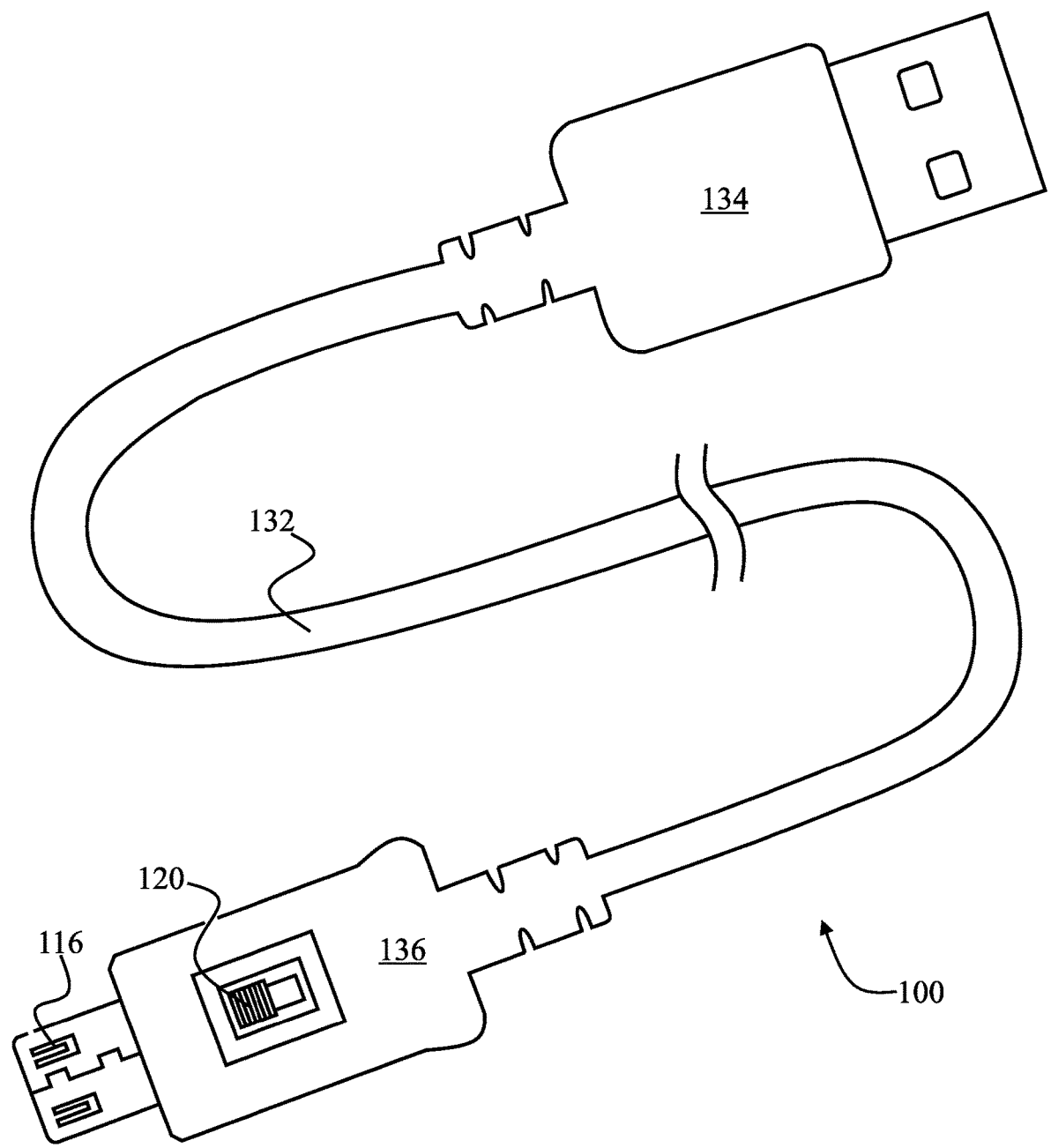
FIG. 8 is a plan view of a modified port of a charging device in accordance with one non-limiting embodiment for use in charging internet-connected devices wherein a switch is deployed to an end of the charging device designed to mate with an internet-connected device.

Referring now to FIG. 8, shown is an additional embodiment of the selectable Charger 100 as it may appear to an end consumer and user. Accordingly, the selectable Charger 100 is displayed with a cord 132 having a first plug 134 to one end of the cord 132 and a second plug 136 to the other end. The first plug 134 and the second plug 136 may be any type of plug known or used in the industry, including but not limited to; USB-A, USB-B, USB-C, mini-USB, micro-USB, or USB 3. Further, the functionality of the physical decoupling of the power and data transmission lines is contemplated to be incorporable on future USB type plugs, or on any plug which may transmit data and power over the same cord 132 or similar type of cord (not shown) which is known and used in the industry. Moreover, all connector pins 112 which may be isolated to the first plug may be collectively referred to as first plug connector pins 113 (as seen in the dotted box in FIG. 17) and all connector pins isolated to the second plug may collectively be referred to as second plug connector pins 119 (as seen in the dotted box in FIG. 18). Accordingly, the switch 120 functionality is incorporated into the portion of the selectable Charger 100 which may engage with an internet-connected device 115 (as indicated in FIG. 14).

Figure 9:
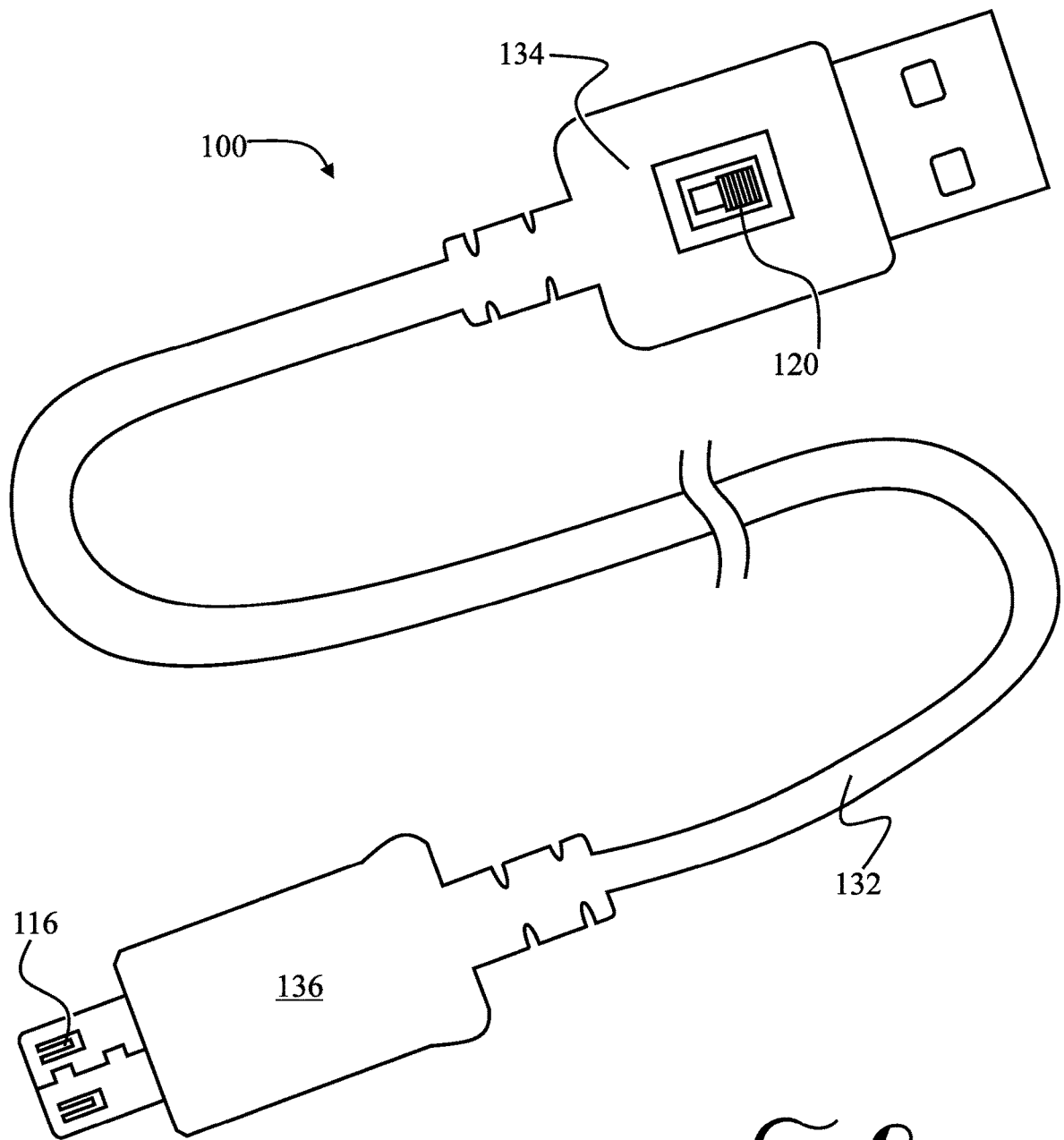
FIG. 9 is a plan view of a modified port of a charging device in accordance with one non-limiting embodiment for use in charging internet-connected devices wherein a switch is deployed to an end of the charging device designed to mate with a standard USB wall charging unit.

Referring now to FIG. 9, shown is an additional embodiment of the selectable Charger 100 as it may appear to an end consumer and user of the selectable Charger 100. Accordingly, the selectable Charger 100 is displayed as a cord 132 with a first plug 134 to one end of the cord 132 and a second plug 136 to the other end. The first plug 134 and the second plug 136 may be any type of plug known or used in the industry, including but not limited to; USB-A, USB-B, USB-C, mini-USB, micro-USB, or USB 3. Further, the functionality of the physical decoupling of the power and data transmission lines is contemplated to be incorporable on future USB type plugs, or on any plug which may transmit data and power over the same cord 132 or similar type of cord (not shown) which is known and used in the industry. Accordingly, the switch 120 functionality is incorporated into the portion of the selectable Charger 100 which may engage with a wall outlet (not shown) or other power supply source (not shown).

Referring now to FIGS. 10 and 11, shown are additional embodiments of the selectable Charger 100 as it may appear to an end consumer and user of the selectable Charger 100. Accordingly, the selectable Charger 100 is displayed as a cord 132 with a first plug 134 to one end of the cord 132 and a second plug 136 to the other end. In accordance with the previously noted statement, the first plug 134 and the second plug 136 may be any type of plug known or used in the industry. Accordingly, the switch 120 functionality in FIG. 10 may be incorporated into any portion of the length of the cable 132. Moreover, the switch 120 illustrated in FIG. 10 may be that of a toggle type switch 120 wherein pressing or de-pressing will activate the switch 120, and a retaining member (not shown) will maintain the switch in either a pressed or de-pressed position. The toggle switch 120 with retaining member (not shown) is that of any commonly used toggle switch which may physically decouple two segments of a single transmission wire 117. The switch 120 functionality of FIG. 11 may likewise be that of a toggle type switch 120 and may be illustrated as being deployed to a terminal end of the selectable Charger 100. Said terminal end may correspond to a portion which may engage with a wall outlet (not shown) or other power supply source (not shown) or that of an internet-connected device 115 (shown in FIG. 14).

Figure 12:
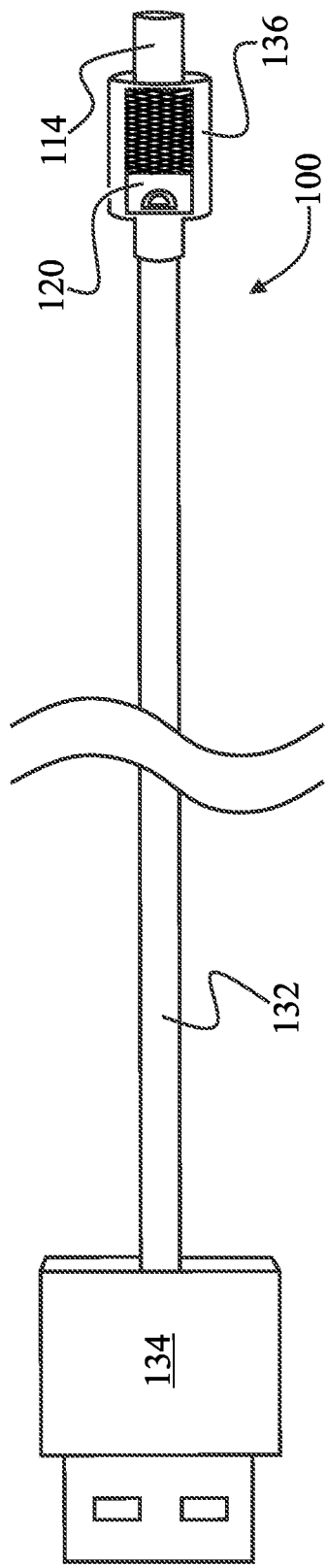
FIG. 12 is a perspective view of a modified port of a charging device in accordance with one non-limiting embodiment for use in charging internet-connected devices wherein a sliding type switch is deployed at a terminal end of a charging device.

Referring now to FIG. 12, shown is an additional embodiment of the selectable Charger 100 which is similar to the embodiment depicted in FIG. 8. Accordingly, the selectable Charger 100 is illustrated with a cord 132 having a first plug 134 to one end of the cord 132 and a second plug 136 to the other end. The first plug 134 and the second plug 136 may be any type of plug known or used in the industry and in accordance with the previously noted statement. Accordingly, the switch 120 functionality illustrated in FIG. 12 may be that of a sliding-type switch 120 wherein the physical movement of the switch 120 may correspond with the physical movement of a connector pin 112 (as illustrated in FIG. 16). FIG. 12 illustrates the switch 120 as incorporated into the portion of the selectable Charger 100 which may engage with an internet-connected device 115 (as indicated in FIG. 14) or that of a power supply.

Figure 13:
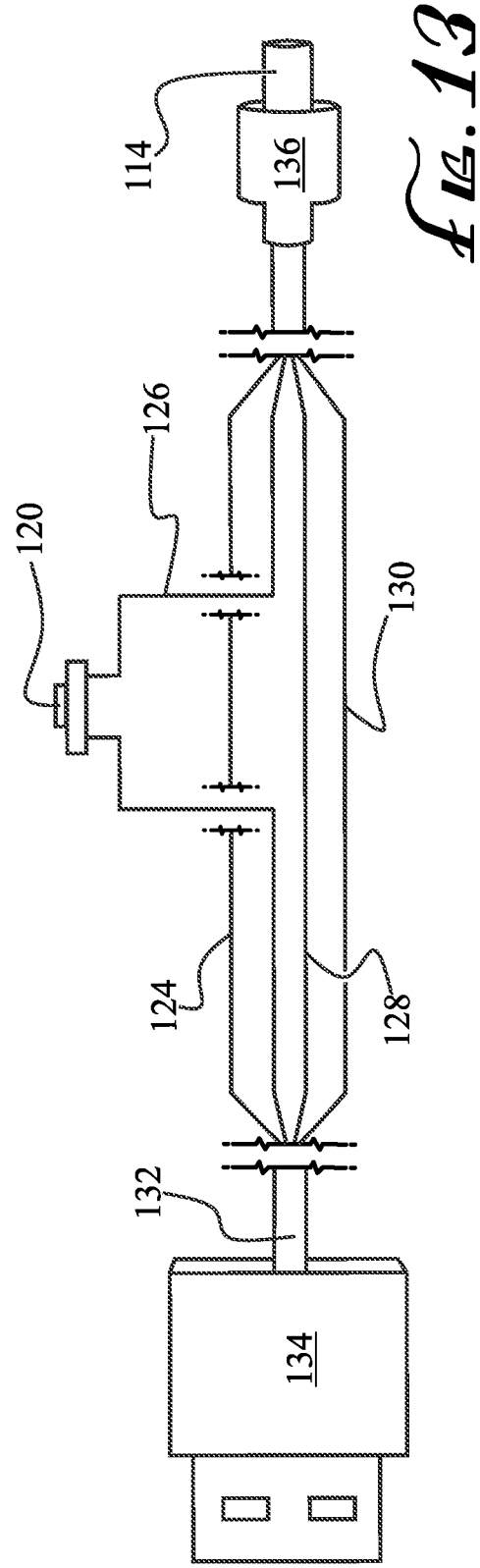
FIG. 13 is a schematic view of a modified cable of a charging device in accordance with one non-limiting embodiment for use in charging internet-connected devices wherein a toggle type switch is deployed at some point along the length of a cable of a charging device.

Referring now to FIG. 13, shown is an additional embodiment of the selectable Charger 100 which is similar to the embodiment depicted in FIG. 10. FIG. 13 shows the internal wiring as a wiring schematic for the manufacture of the selectable Charger 100. As similar to FIG. 10, the selectable Charger 100 is illustrated with a cord 132 having a first plug 134 to one end of the cord 132 and a second plug 136 to the other end. The internal wiring of this illustration shows the power supply wire 124, the first data transmission wire 126, the second data transmission wire 128, and the ground wire 130. Accordingly, this illustration of FIG. 12 depicts the internal configuration as indicated in FIG. 10, with a switch 120 being deployed along a length of the cord 132.

The switch 120 as illustrated in FIG. 13 may be shown as being deployed to the first data transmission wire 126. The toggling or sliding of the switch 120 may correspond to an on and an off configuration for the data functionality of the selectable Charger 100. The first plug 134 and the second plug 136 may be any type of plug known or used in the industry and in accordance with the previously noted statement. Accordingly, the switch 120 functionality illustrated in FIG. 13 may be that of a sliding-type switch 120 wherein the physical movement of the switch 120 may correspond with the physical inability of a signal to be transmitted from the first plug 134 to the second plug 136 or vice versa. Alternatively, the switch 120 functionality illustrated in FIG. 13 may be that of a toggling type switch 120 wherein the pressing or de-pressing movement of the switch 120 may correspond with the physical inability of a signal to be transmitted from the first plug 134 to the second plug 136 or vice versa.

FIG. 14 may illustrate one potential wiring schematic for the switch 120 to be deployed to the first data transmission wire 126. Other potential embodiments may follow this basic wiring schematic as illustrated in FIG. 14, including the switch 120 being deployed on the second data transmission wire 128, the power supply wire 124, or the ground wire 130 as may be needed by the ultimate desires of the end-user. Illustrated is a stand-in for any internet-connected device 115 in dotted lines. Using this schematic, persons skilled in the art may follow the path of an electrical charge and/or a data packet as it leaves a source 138 and encounters the switch 120. At this point, if the switch is selected to an off configuration, then only the power supply wire 124 may be active and power may then be transmitted along the power supply wire 124 without concern for data transmission along the first data transmission wire 126. If a user should elect to also have data transmission along the first data transmission wire 126, then the switch 120 may be placed into an on configuration and data may be transmitted along a completed circuit. It should be noted that the embodiment illustrated in FIG. 14 is not limiting and switch 120 could be placed on the second data transmission wire 128, the power supply wire 124, or onto the ground wire 130 depending on the needs of the manufacturer or end-user. Further illustrated is resistor 140 of the internet-connected device 115 and electrical ground 142 of the circuit. Additional symbols utilized in the schematic illustrated in FIG. 14 are commonly used should be understood by those skilled in the art.

FIGS. 15 and 16 represent a USB-C type port 144. Commonly understood in the industry is that USB-C type ports 144 utilize a multiplicity of various connector pins 112. Illustrated in FIGS. 15 and 16 are that of the full array of connector pins 112 as shown in FIG. 15 and those connector pins 112 which correspond to data transmission being retracted as illustrated in FIG. 16. Specifically, FIG. 15 illustrates how a USB-C type connection port 144 appears prior to retraction, while FIG. 16 illustrates how the USB-C type connection port 144 appears subsequent to retraction. For convenient reference, the data pins have been additionally indicated as a third data pin 146, a fourth data pin 148, a fifth data pin 150, and a sixth data pin 152. Collectively and throughout this disclosure, these pins may be referred to as data transmission pins 154. As indicated in FIG. 16, the data transmission pins 154 are not capable of making connections with internet-connected devices (as illustrated in FIG. 14) and thus cannot transmit data. Accordingly, switch 120 as shown in FIG. 15 corresponds to an on configuration, while the switch shown in FIG. 16 corresponds to an off configuration.

Figure 17:
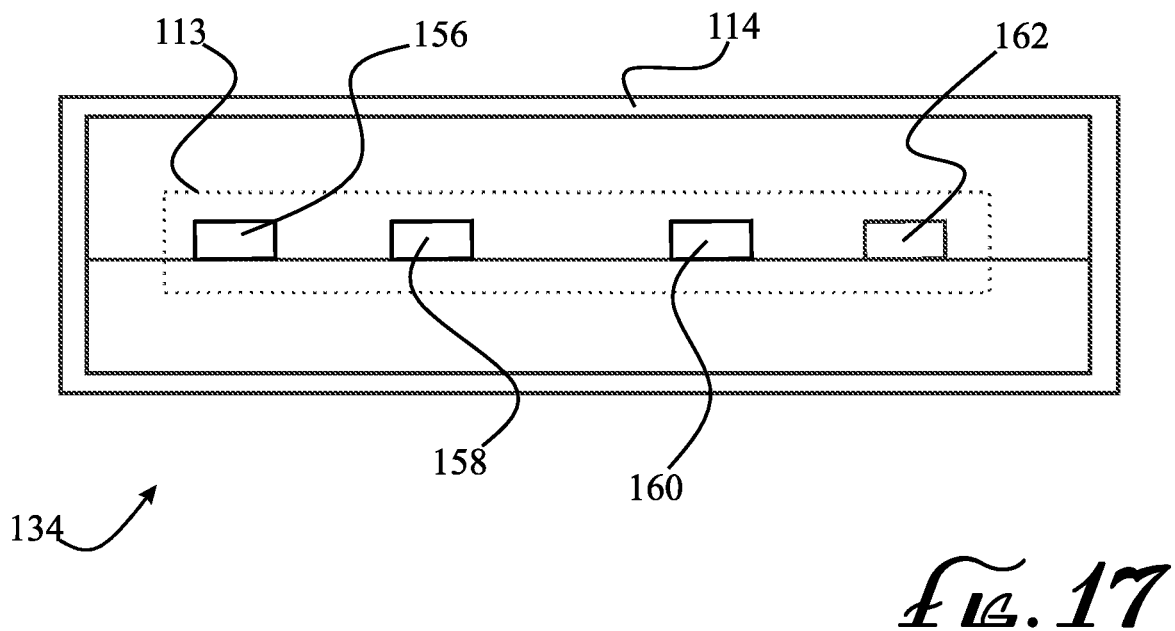
FIG. 17 is a plan view of a first plug with all first plug connector pins displayed in accordance with one non-limiting embodiment.
Figure 18:
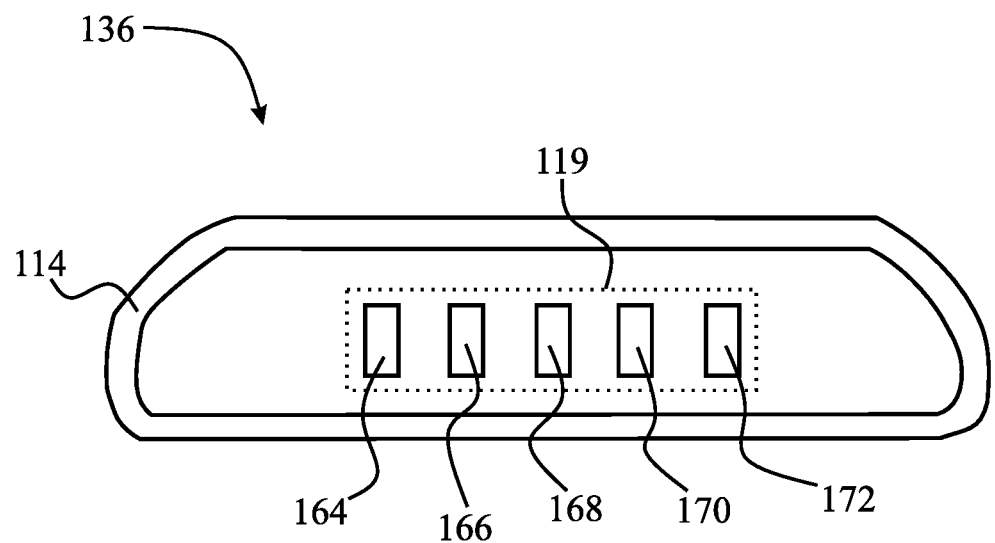
FIG. 18 is a plan view of a second plug with all second plug connector pins displayed in accordance with one non-limiting embodiment.

Referring now to FIGS. 17 and 18, shown are an illustration representing a grouping of connector pins 112 as they relate to the first plug shown in FIG. 17 and the second plug shown in FIG. 18. Shown specifically in FIG. 17 are a collection of connector pins 112 which are isolated to the first plug and are referred to as first plug connector pins 113 as indicated with the illustration of the dotted box in FIG. 17. Throughout this disclosure, any connector pin 112 which may be isolated to the first plug may be referred to as a first plug connector pin 113. This distinction between isolated groups of connector pins 112 may be made for convenient reference. The specific first plug connector pins 113 as illustrated in FIG. 17 include but are not limited to a first plug power pin 156, a first plug first data pin 158, a first plug second data pin 160, and a first plug ground pin 162. The specific second plug connector pins 119 illustrated in FIG. 18 include but are not limited to a second plug power pin 164, a second plug first data pin 166, a second plug second data pin 168, a second plug identification pin 170, and a second plug ground pin 172. Throughout this disclosure, any connector pin 112 which may be isolated to the second plug may be referred to as a second plug connector pin 119. As is illustrated in FIG. 15, there may be more connector pins 112 which have not been specifically identified herein but may be in later filings. This disclosure is not limited to the specifically mentioned group of first plug connector pins 113 or the group of second plug connector pins 119.

Figure 19:
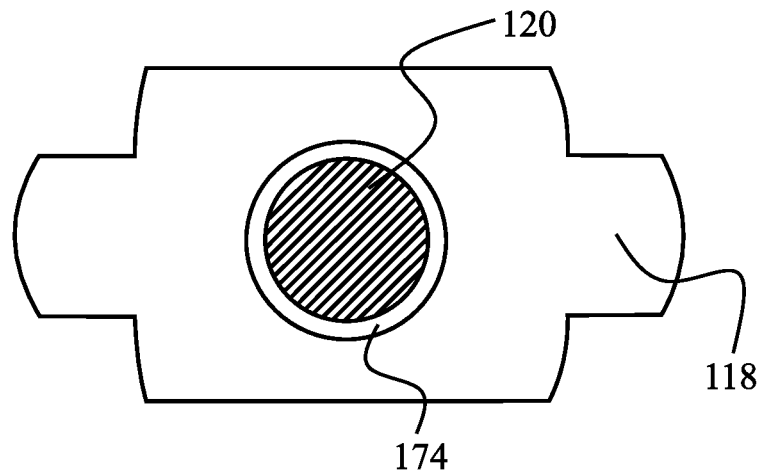
FIG. 19 is a plan view of a push-type switch wherein an LED indicator light is shown in accordance with one non-limiting embodiment.
Figure 20:
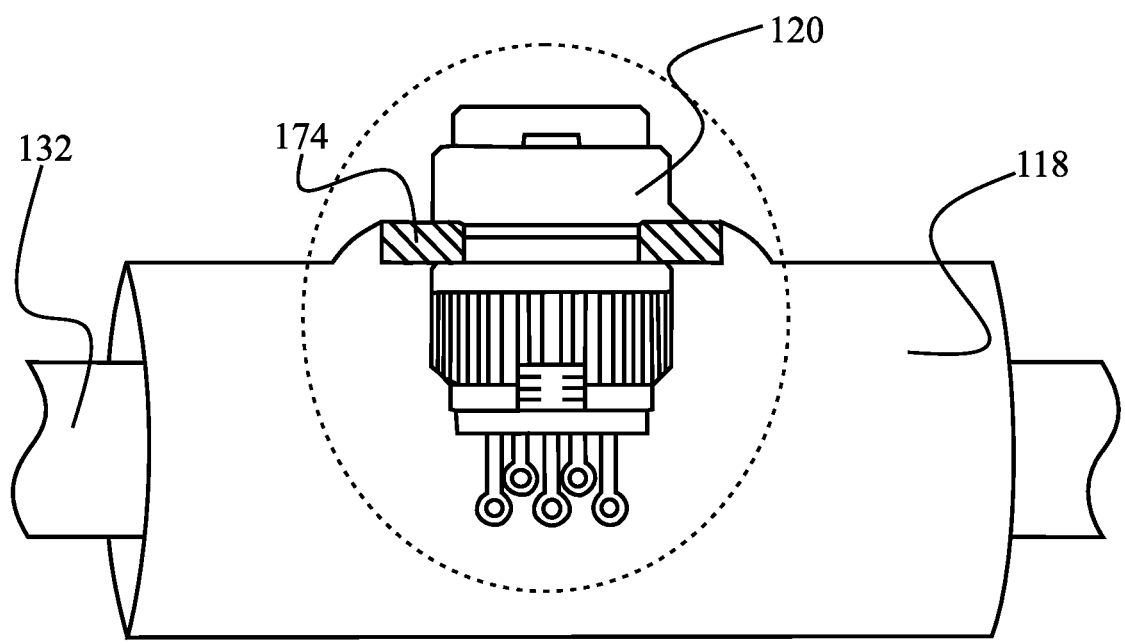
FIG. 20 is a perspective view of the internal components of the push-type switch shown in FIG. 19 wherein an LED indicator light is shown in accordance with one non-limiting embodiment.

Referring to FIGS. 19 and 20, illustrated is one contemplated embodiment of an LED indicator 174 for the switch 120 which may be deployed to either a plug (i.e., the first plug 134 or the second plug 136) or at any length along the cord 132. This embodiment is described as being illuminated by an LED, but other possible illumination types are contemplated. Moreover, the switch 120 as shown may be that of a push-type switch 120. FIG. 20 specifically illustrates that of a push-type switch 120 as it may be viewed through the casing 118 surrounding the switch 120. The dotted line encircling the components of the switch 120 illustrates how the push-type switch 120 may appear without the casing 118. Other non-described portions which may be internal to the dotted circle of FIG. 20 of the selectable Charger 100 switch 120 are not illustrated in an effort to simplify FIG. 20, though all other components needed for proper functioning are understood to be present. The LED indicator 174 may be illuminated when the switch 120 is in both the active and the inactive configuration and illuminated by differing colors to indicate the status of the switch, or the LED indicator 174 may be illuminated during only the active or only the inactive configuration of the switch 120.

Figure 21:
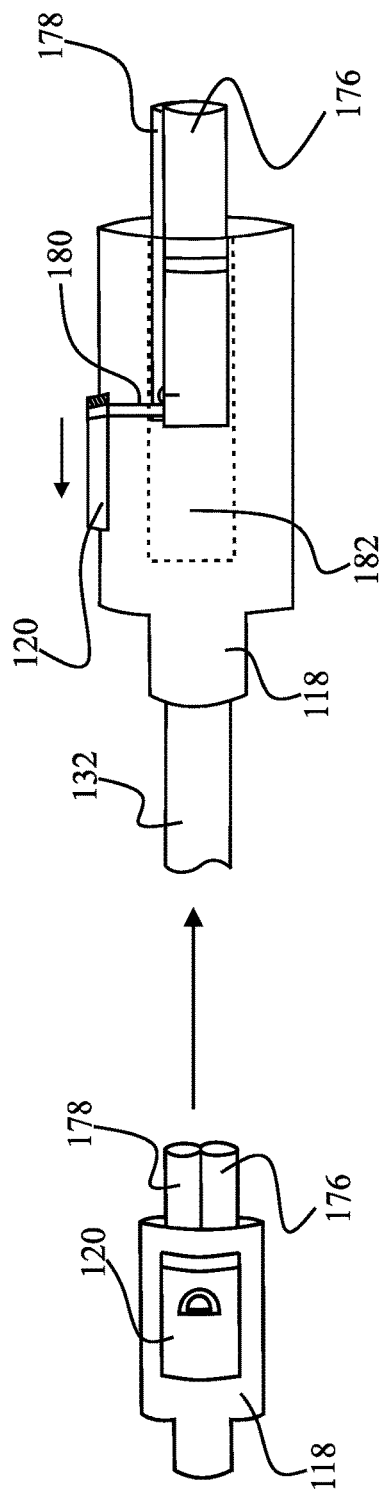
FIG. 21 is a perspective top and side view of one potential embodiment of a selectable Charger terminal port wherein the data connectors and the power connectors have been isolated to respective ends of the plug.
Figure 22:
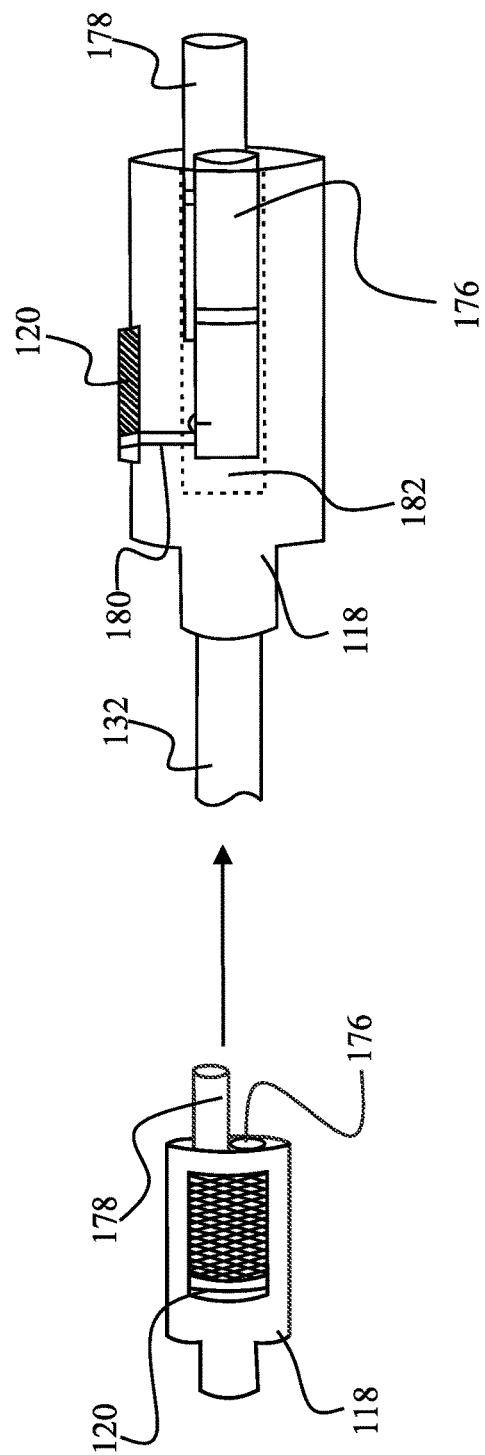
FIG. 22 is a perspective top and side view of one potential embodiment of a selectable Charger terminal port wherein the data connectors and the power connectors have been isolated to respective ends of the plug and the plug is selected to a power only transmittable configuration.
Figure 23:
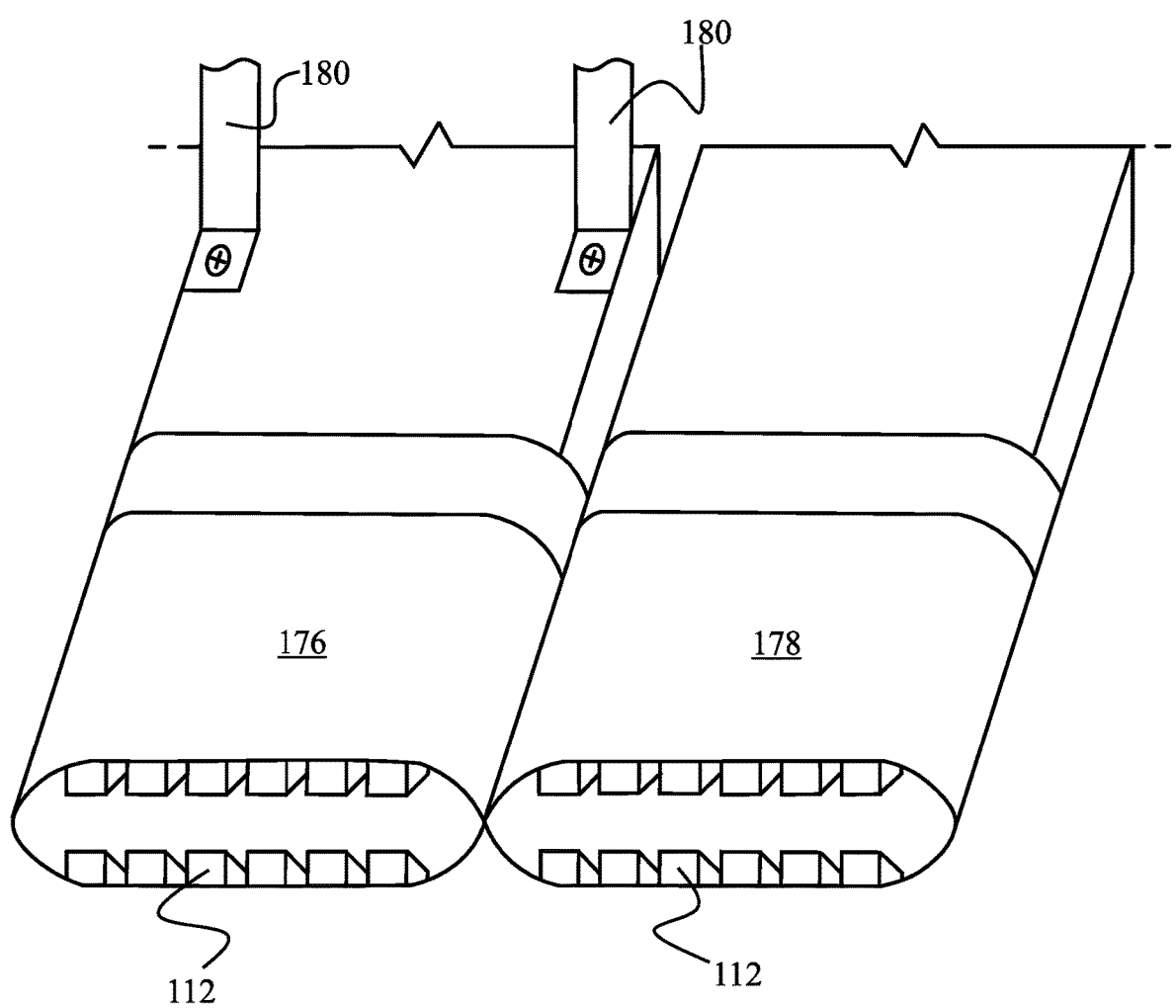
FIG. 23 is an enlarged perspective view of one potential embodiment of a selectable Charger terminal port wherein the data connectors and the power connectors have been isolated to respective ends of the plug.

Referring now to FIGS. 21, 22 and 23, shown is one contemplated embodiment for a potential retraction means. Accordingly, the various connector pins 112 may be configured such that all pins related to data may be isolated to one side and all pins relating to power may be isolated to another. FIG. 23 illustrates this isolation embodiment well. FIGS. 21 and 22 illustrate how the potential means may operate. Illustrated is a data prong 176 and a power prong 178. The data prong 176 may be configured to be anchored to the switch 120 by use of a connection member 180. The connection member 180 may be engaged to the data prong 176, the power prong 178, or both, depending on the needs of the consumer or manufacturer. The connection member 180 may be configured to link the switch 120 to either the data prong 176 or the power prong 178, or both. Thus, with the mechanical linkage of the switch 120 to the power pin 102, or data prong 176, or both, retraction of the switch 120 results in retraction of the data prong 176, or power prong 178, or both. This is illustrated by the arrow above the switch 120 in FIG. 21, wherein the leftward directional movement of the switch 120 results in the data prong 176 as shown between FIG. 21 and FIG. 22. Accordingly, FIG. 22 illustrates how the data prong 176 may appear in a retracted configuration.

Moreover, even though it is not illustrated, it should be understood that the switch 120 may be divided such that either the data prong 176 or the power prong 178 may be retracted independently. Thus, it is contemplated that there may be a connection member 180 for the data prong 176 and a connection member 180 for the power prong 178 thus resulting in independent movement of the data prong 176 and the power prong 178 via the switch 120.

Further illustrated in FIGS. 21 and 22 are that of a retraction cavity 182. The retraction cavity 182 may comprise a hollowed-out portion of the casing 118 and may permit the proper movement of the data prong 176 and/or the power prong 178 to move into the casing 118 thereby preventing physical contact with an internet-connected device 115. Moreover, the retraction cavity 182 may be sized such that any transmission wires 117 (not shown) used to transmit data and/or power may also have the available space to retract and fold into the retraction cavity 182.

Figure 24:
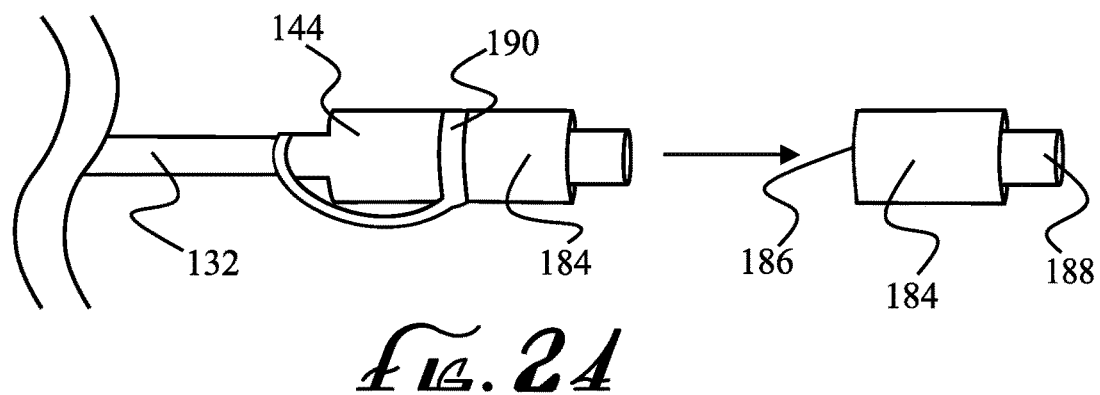
FIG. 24 is a perspective view of one potential embodiment of an adaptor for use with a USB plug wherein the adaptor is configured to engage with the male end of the USB plug; and, FIG. 25 is a perspective view of one potential embodiment of an adaptor for use with a USB plug wherein the adaptor is illustrating both a female adaptor end and a male adaptor end.
Figure 25:
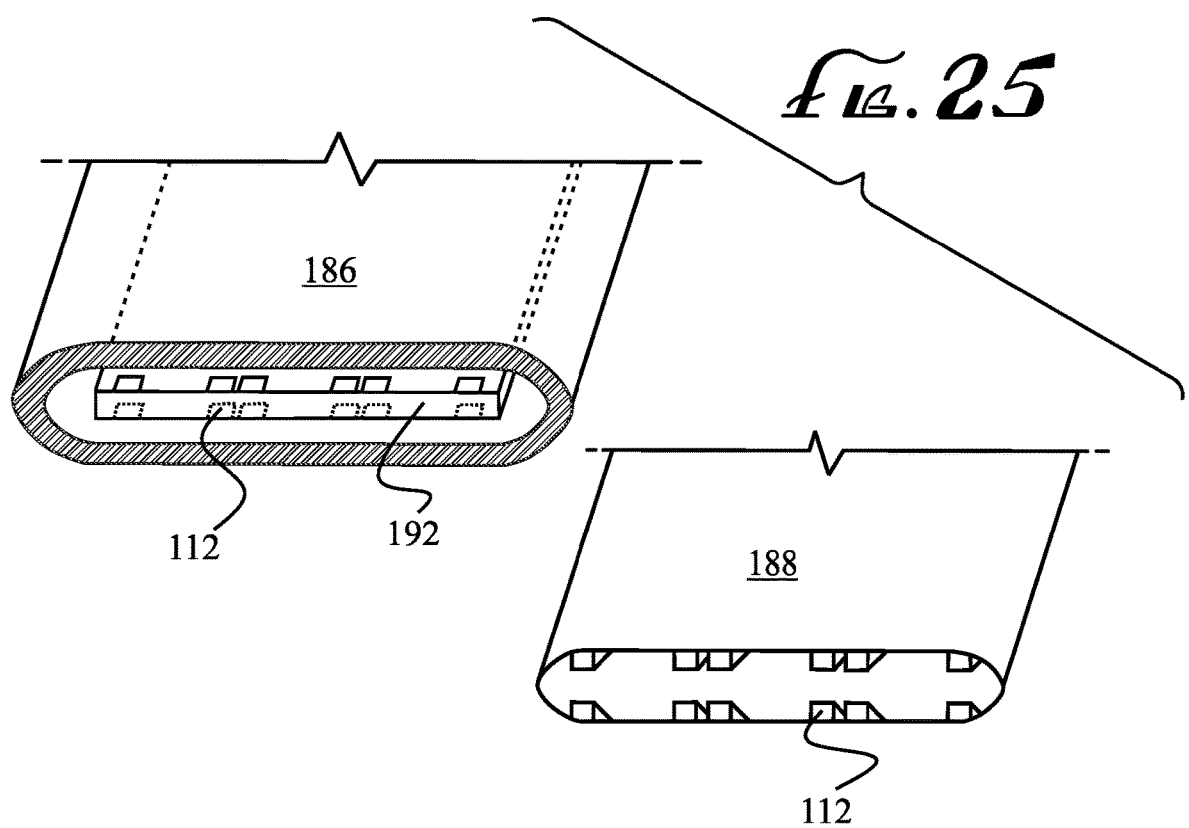

FIGS. 24 and 25 illustrate an additional potential embodiment for the physical blocking of data and/or power transmission signals from a first internet-connected device 115 (not shown) to a second internet-connected device 115 (not shown). Illustrated is the use of an adaptor 184 which may mate with an existing USB type plug such as the micro-USB 200 illustrated in FIG. 1. Here, such plug is illustrated as a USB-C type port 144 wherein the adaptor 184 may couple with an unmodified version of the USB-C type port 144. The adaptor 184 may be configured such that some of the connector pins 112 may be lacking as is illustrated in FIG. 25. Thus, coupling by the adaptor 184 may result in the physical inability of the existing micro-USB 200 or other USB being incapable of transmitting a signal between internet-connected devices 115 (not shown). For the adaptor 184 to have proper functionality, it may be placed onto the male end of the plug, and in between the male end of the plug and the target input port. As is illustrated in FIG. 25, the female adaptor end 186 is configured to mate with the male side (obscured in FIG. 24 by adaptor 184) of any given USB on the market currently with only the basic connector pins 112 layouts and casing 118 sizing needing adjustment. Thus, while these FIGS. 24 and 25 illustrate the adaptor 184 as mate-able with a USB-C type port 144, any type of connector and/or port is contemplated to function with the adaptor 184 both now in existence and those types being developed.

The male adaptor end 188 is further configured to provide only those connector pins 112 which may be used to deliver power, data, or a selection of power or data. Moreover, the particular selection of connector pins 112 which may be used in the adaptor 184 need not be limited to just data pins or power pins and may be any type of connector pins 112 needed for a particular end consumers' need. The adaptor 184 may likewise come with a retention strap 190 which may aid in retaining the female adaptor end 186 to the male USB end (not shown). The female adaptor end 186 further may have a pinboard 192 which may support the connector pins 112 for proper data and/or power transmission to any given transmission wire 117.

Having disclosed the structure of the preferred embodiments, it is now possible to describe its function, operation, and use. The switch 120 may result in total cut from all power and data transmission, the cut off of only power, or the cut off of only data. The switch 120 may be engageable in an on and an off configuration. The switch 120 may be placed at any location on a selectable Charger 100, including any portion which may engage with an internet-connected device 115, which may engage with a power supply source (not shown), or along any portion of the cord 132.

One contemplated method of use of the selectable Charger 100 may be by initially having a user of the selectable Charger 100 decide if the power supply source (not shown) is a secure source, for example at a home location or office location. Then, if the power supply source (not shown) is not a secure source, the user may then decouple the data transmission capability by selecting the switch 120 to an off configuration. The said off configuration may occur by toggling or by a retraction means (as shown in FIG. 16). Said retraction means may occur by any means known by those skilled in the art, including but not limited to; by way of a retention member (not shown) engaged at the base of the power pin 102, a biasing member (not shown) engaged at the base of the power pin 102, or by use of a lever (not shown) engaged at the base of the power pin 102. Then the user of the selectable Charger 100 may engage the selectable Charger 100 with the power supply source (not shown) confident that no data may be harvested or stolen from the internet-connected device 115 (as shown in FIG. 14) which may need charging. To resume data transmission functionality, a user may simply alter the switch 120 to an on configuration as shown in FIG. 15.

An additionally contemplated method of the selectable Charger 100 may be a user of the selectable Charger 100 initially deciding that the power supply source (not shown) is a secure source, for example at a home location or office location. Then, subsequently realizing that the power source (not shown) is not secure, then subsequently decoupling the data transmission capability while the selectable Charger is in use by way of altering the switch 120 to an off configuration. Then the user of the selectable Charger 100 may continue to charge the internet-connected device 115 by continued engagement of the selectable Charger 100 with the power supply source (not shown) confident that no data may be harvested or stolen from the internet-connected device from the point of altering the switch 120 to an off configuration. To resume data transmission functionality, a user may simply alter the switch 120 to an on configuration.

Additionally, a user may desire to only transmit data and does not wish to engage with a power supply, even though the internet-connected device (as shown in FIG. 14) may also provide power. Reasons for this are many, for example, if the device which contains the data has a fully charged battery, it may be desirable to avoid further power charging to extend the life of the battery. Thus, the user may elect to decouple the power transmission capability of the selectable Charger 100. This may be performed prior to engaging the internet-connected device 115 with the selectable Charger 100 or while the selectable Charger 100 is in use by way of altering the switch 120 to an off configuration, or by a retraction means (not shown). To resume power transmission functionality, a user may simply alter the switch 120 to an on configuration.

This disclosure herein relates to a power and data transfer selectable Charger 100 cable comprising a first plug 134 connected to one end of a cord 132 and a second plug 136 connected to the other end of the cord 132, where the cord 132 may span between the first plug 134 and the second plug 136. Further, the first plug 134 and the second plug 136 may each have a multiplicity of connector pins 112. The cord 132 may further have a multiplicity of transmission wires 117. The transmission wires 117 and the connector pins 112 may be configured for transmission of an electrical current. Additionally, a switch 120 may be configured to permissively control the transmission of the electrical current by use of a reversible selection of an on configuration or an off configuration of the switch 120.

The multiplicity of transmission wires 117 may each individually further comprise a first data transmission wire 126, a second data transmission wire 128, and a power supply wire 124. Additionally, the connector pins may each individually further comprise a power pin 102, a first data pin 104, and a second data pin 106. The switch 120 may be connected to the first data transmission wire 128 and may be configured to permissively control the electrical current transmission of the first data transmission wire 128. The switch 120 may also be connected to the second data transmission wire 128 and be configured to permissively control the electrical current transmission of the second data transmission wire 128. The switch 120 may also be connected to the power supply wire 124 and be configured to permissively control the electrical current transmission of the power supply wire 124. The switch 120 may also be connected to the first plug 134 or the second plug 136 and be configured to retract the first data pin 104, the second data pin 106, the power pin 102, or any other connector pin 112 which may be present in either the first plug or the second plug.

This disclosure herein may further relate to a data and power electable transfer and fully selectable Charger 100 cable which may comprise a first plug 134 connected to one end of a cord 132 and a second plug 136 connected to the other end of the cord 132, where the cord 132 may span between the first plug 134 and the second plug 136. Further, connector pins 112 which may be isolated to the first plug may be collectively referred to as first plug connector pins 113 in further accord with the illustration of the dotted box in FIG. 17. Connector pins which may be isolated to the second plug may collectively be referred to as second plug connector pins 119 in accord to the illustration in the dotted box in FIG. 18). The first plug 134 may have a multiplicity of first plug connector pins 113 wherein one or more than one of the connector pins may further each individually comprise a first plug power pin 156, a first plug first data pin 158, a first plug second data pin 160, and a first plug ground pin 162. Additionally, the second plug 136 may also have a multiplicity of second plug connector pins 119 wherein one or more than one of the connector pins may individually further comprise a second plug power pin 162, a second plug first data pin 166, a second plug second data pin 168, a second plug identification pin 179, and a second plug ground pin 172. The cord 132 may further have a multiplicity of transmission wires 117. The transmission wires 117, the first plug connection pins 113, and the second plug connection pins 119 may be configured for transmission of an electrical current. The multiplicity of transmission wires 117 may each individually further comprise a first data transmission wire 126, a second data transmission wire 128, and a power supply wire 124. Further, the multiplicity of transmission wires 117 may refer to a data transmission wire and a power supply wire in the singularity without the use of the term "a first" or "a second."

This disclosure herein may further relate to a selectable Charger 100 cable which is selectable for power transfer and selectable for data transfer which may comprise a switch 120 for a permissible selection of data transfer or the permissible selection of power transfer between a first electronically powered device 115 and a second electronically powered device 115. Further, a first plug 134 connected to one end of a cord 132 and a second plug 136 connected to the other end of the cord 132, where the cord 132 may span between the first plug 134 and the second plug 136. The first plug 134 may be configured to reversibly engage with the first electronically powered device 115 and the second plug 136 may be configured to reversibly engage with the second electronically powered device 115. It should be noted that connector pins 112 which may be isolated to the first plug may be collectively referred to as first plug connector pins 113 in further accord with the illustration of the dotted box in FIG. 17. Further, connector pins isolated to the second plug may collectively be referred to as second plug connector pins 119 in accord to the illustration in the dotted box in FIG. 18). The first plug 134 may have a multiplicity of first plug connector pins 113 wherein one or more than one of the connector pins may further each individually comprise a first plug power pin 156, a first plug first data pin 158, a first plug second data pin 160, and a first plug ground pin 162.

Additionally, the second plug 136 may also have a multiplicity of second plug connector pins 119 wherein one or more than one of the connector pins may individually further comprise a second plug power pin 162, a second plug first data pin 166, a second plug second data pin 168, a second plug identification pin 179, and a second plug ground pin 172. Further, the cord 132 may also have a multiplicity of transmission wires 117 wherein at least one of the transmission wires 117 may each individually further comprise a first data transmission wire 126, a second data transmission wire 128, and a power supply wire 124. The transmission wires 117, the first plug connector pins 113, and the second plug connector pins 119 may further be configured for transmission of an electrical current, the electrical current may be either power or data.

Further, the switch 120 may be configured to reversibly stop the transmission of the electrical current between the first electronically powered device 115 and the second electronically powered device 115 by use of the permissible selection of an on configuration or an off configuration of the switch 120. The switch 120 may also be connected to the first data transmission wire 126 and be configured to permissively control the electrical conduction transmission of the first data transmission wire 126. The switch 120 may also be connected to the second data transmission wire 128 and be configured to permissively control the electrical conduction transmission of the second data transmission wire 128. The switch 120 may also be connected to the power supply wire 124 and be configured to permissively control the electrical conduction transmission of the power supply wire 124. The switch 120 may also be connected to the first plug 134 or the second plug 136.

While embodiments of the various disclosures have been illustrated and described, it is not intended that these embodiments illustrate and describe all possible forms of the subject matter. Rather, the words used in the specification are words of description rather than limitation, and it is understood that various changes may be made without departing from the spirit and scope of this disclosure.

Accordingly, it is not intended that the various embodiments be limited except by the appended claims. Insofar as the description above and the accompanying drawings disclose any additional subject matter that is not within the scope of the claims below, the various embodiments are not dedicated to the public and the right to file one or more applications to claim such an additional embodiment is reserved.

What is claimed is:

1. A power and data transfer cable comprising:
   a first plug connected to one end of a cord, a second plug connected to the other end of the cord, the cord spanning between the first plug and the second plug;
   the cord configured for the transmission of an electrical current;
   a switch configured to permissively control the transmission of the electrical current by use of a reversible selection of an on configuration or an off configuration of the switch; and,
   a lighted indicator.

2. The power and data transfer cable of claim 1 wherein the cord further comprises at least one a data transmission wire and least one a power supply transmission wire; and,
   wherein the first plug and the second plug further comprise at least one a connector pin for power and at least one a connector pin for data.

3. The power and data transfer cable of claim 1 wherein the lighted indicator is disposed to the switch, the lighted indicator being capable of displaying at least one color, the at least one color of the lighted indicator corresponding to a status of the switch.

4. The power and data transfer cable of claim 2 wherein the switch is connected to the data transmission wire and is configured to permissively control the electrical current therein.

5. The power and data transfer cable of claim 2 wherein the switch is connected to the power supply transmission wire and is configured to permissively control the electrical current transmission therein.

6. The power and data transfer cable of claim 1 wherein the switch is on the first plug.

7. The power and data transfer cable of claim 2 wherein the switch is on the second plug.

8. The power and data transfer cable of claim 2 wherein the switch is on the cord.

9. A data and power electable transfer cable comprising:
   a first plug connected to one end of a cord, a second plug connected to the other end of the cord, the cord spanning between the first and the second plug;
   the first plug having a multiplicity of first plug connector pins wherein at least one or of the connector pins further comprise a first plug electrical power connector pin and a first plug electrical data transmission connector pin;
   the second plug having a multiplicity of second plug connector pins wherein at least one of the connector pins further comprise a second plug electrical power connector pin and a second plug electrical data transmission connector pin;
   the cord having a multiplicity of transmission wires wherein at least one of the transmission wires each individually further comprise a data transmission wire and et an electrical power transmission wire;
   a switch being configured to permissively control the transmission of an electrical current by use of a reversible selection of an on configuration or an off configuration of the switch; and,
   a lighted indicator.

10. The data and power electable transfer cable of claim 9 wherein the lighted indicator being disposed to the switch, the lighted indicator configured to match a color with a status of the switch forming a plurality of color with status combinations, wherein at least one distinct color with status combination is directed to a data off configuration, at least one distinct color with status combination is directed to a data on configuration, at least one distinct color with status combination is directed to a power off configuration, and at least one distinct color with status combination is directed to a power only configuration.

11. The power and data electable transfer cable of claim 9 wherein the switch is connected to the data transmission wire and is configured to permissively control the electrical current transmission therein.

12. The power and data electable transfer cable of claim 9 wherein the switch is connected to the electrical power transmission wire and is configured to permissively control the electrical current transmission therein.

13. The power and data electable transfer cable of claim 9 wherein the switch is connected to the first plug and is configured to permissively control the electrical current transmission therein.

14. The power and data electable transfer cable of claim 9 wherein the switch is connected to the second plug and is configured to permissively control the electrical current transmission therein.

15. A selectable for owe transfer and selectable for data transfer cable comprising:
   a switch for a permissible selection of data transfer and a permissible selection of power transfer between a first electronically powered device and a second electronically powered device;
   a first plug connected to one end of a cord, a second plug connected to the other end of the cord, the cord spanning between the first plug and the second plug;
   the first plug configured to reversibly engage with the first electronically powered device and the second plug configured to reversibly engage with the second electronically powered device;
   the first plug having a multiplicity of first plug connector pins wherein at least one or more than one of the connector pins further comprise a first plug electrical power connector pin and a first plug electrical data transmission connector pin;

the second plug having a multiplicity of second plug connector pins wherein at least one or more than one of the connector pins further comprise a second plug electrical power connector pin and a second plug electrical data transmission connector pin;

the cord having a multiplicity of a transmission wires wherein at least one of the transmission wires further comprise a data transmission wire and an electrical power supply transmission wire;

the transmission wires, the first plug connector pins, and the second plug connector pins all being configured for a transmission of an electrical current;

the switch configured to reversibly stop the transmission of the electrical current between the first electronically powered device and the second electronically powered device by use of the permissible selection of an on configuration or an off configuration of the switch, and;

a lighted indicator, the lighted indicator being disposed to the switch, the lighted indicator capable of displaying at least one color, the at least one color corresponding with a status of the switch thereby forming a plurality of a color status combination for the lighted indicator, each color and status combination being different.

16. The selectable for power transfer and selectable for data transfer cable of claim 15 wherein the switch is connected to the data transmission wire and is configured to permissively control the electrical current transmission therein.

17. The selectable for power transfer and selectable for data transfer cable of claim 15 wherein the switch is connected to the electrical power supply transmission wire and is configured to permissively control the electrical current transmission therein.

18. The selectable for power transfer and selectable for data transfer cable of claim 15 wherein the switch is connected to the first plug.

19. The selectable for power transfer and selectable for data transfer cable of claim 15 wherein the switch is connected to the second plug.

* * * * *